Figure 1:
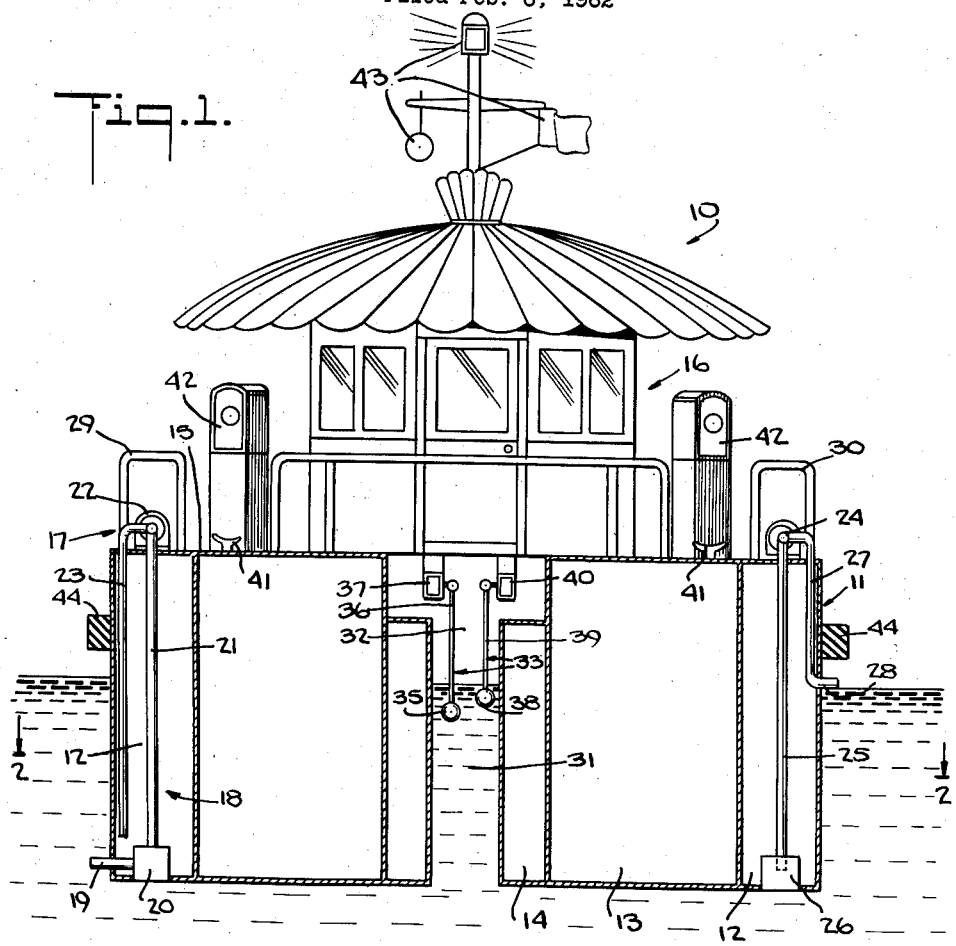

Feb. 5, 1963

A. J. SCHULTZ 3,076,205

FLOATING MARINE FUEL SUPPLY TERMINAL

Filed Feb. 6, 1962

INVENTOR.
ARNOLD J. SCHULTZ
BY
*Kenyon & Kenyon*
ATTORNEYS

United States Patent Office 3,076,205
Patented Feb. 5, 1963

3,076,205
FLOATING MARINE FUEL SUPPLY TERMINAL
Arnold J. Schultz, 223 61st St., Brooklyn, N.Y.
Filed Feb. 6, 1962, Ser. No. 171,377
10 Claims. (Cl. 9—8)

This invention relates to marine apparatus adapted for offshore refueling services of marine craft and more particularly to floating marine offshore refueling apparatus having a novel compartmented construction.

An object of this invention is to provide offshore marine refueling apparatus in which a predetermined freeboard is maintained regardless of the fuel which may be dispensed from the apparatus during use.

Another object is to provide apparatus as above described in which ballast water is automatically maintained in the device in such an amount to stabilize the structure at a preselected water line.

Briefly the present invention involves a floating marine fuel supply terminal comprising a compartmented cylindrical hull construction having a service deck thereon and three concentrically disposed liquid tight storage tanks thereunder consisting of an outer ballast water tank, an intermediate gasoline tank, and an inner diesel fuel tank. The outer tank is adapted to hold ballast water in an amount approximately equal to the combined weights of the gasoline and diesel fuel capable of being stored in the other tanks. The diesel fuel tank has a hollow axial core portion which defines an interior recess under said deck and above a preselected water line.

A first pump means is mounted on said deck having an intake line extending to the bottom of the ballast water tank and further extending externally of the hull below the water line and a discharge line extending into the ballast water tank. A second pump means is mounted on the deck having an intake line extending to the bottom of the ballast water tank and a discharge line extending externally of the hull immediately above the water line.

First and second float means are mounted on said hull within said interior recess at said water line, the first float means associated with the first pump means to energize the same when the freeboard of the hull extends below the water line to pump ballast water into the ballast water tank. The second float means is associated with the second pump means and energizes the latter when the water line is submerged to pump ballast water from the ballast water tank externally of said hull.

A superstructure is provided on said deck for housing personnel and equipment of the type associated with marine refueling services and for carrying such equipment as is required by the coast guard and other marine authorities.

Figure 2:
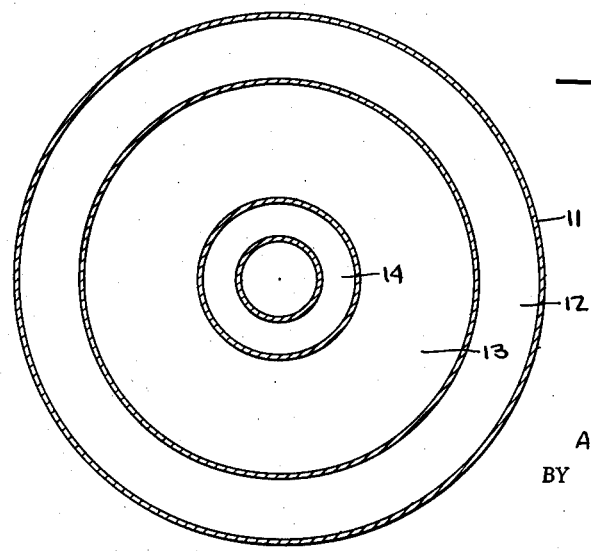

Other objects and features of the invention will become apparent from the following description and claims and in the drawings in which:

FIG. 1 is a partially sectioned elevation of one embodiment of the invention; and
FIG. 2 is a reduced section taken along lines 2—2 of FIG. 1.

Referring now to the drawings, a marine service station is designated generally by reference numeral 10. It has a cylindrical hull 11 consisting of three concentric liquid tight cylindrical compartments 12, 13 and 14 integrally formed with a service deck 15 across the top thereof carrying superstructure 16 thereon as shown for using personnel and equipment.

Compartments 13 and 14 are provided for storing gasoline and diesel fuel respectively and compartment 12 is provided for maintaining an adequate volume of ballast water therein for purposes to be described in greater detail hereafter. In one typical embodiment the ballast water tank 12 capacity is approximately 9,166 gallons, the gasolin tank 13 capacity being approximately 12,408 gallons and the diesel oil tank 14 having a capacity of 1,175 gallons. In said embodiment the outer diameter of the hull is about 22 feet, the height or depth 8 feet and the outer diameter of the gasoline tank 13 is 17 feet and the outer diameter of the diesel fuel tank 14 is 5 feet.

Suitable access and filling holes (not shown) are provided for each of said tanks to permit filling and cleaning, etc.

Mounted on said deck 15 preferably near one edge thereof is a first pump means 17 for pumping external water into ballast tank 12. Pump means 17 has an intake line 18 constituted by externally communicating pipe section 19 located at or near the bottom of hull 11, strainer 20 and vertical intake line 21 which interconnects strainer 20 with pump 22 which may be of any conventional type such as a centrifugal pump or the like. Discharge line 23 extends from said pump into said ballast water tank 12 terminating slightly above the bottom of hull 11 as shown.

Similarly, pump means 24 is mounted on deck 15 preferably near another edge thereof and has an intake line 25 extending to strainer 26 located at or near the bottom of the interior of ballast water tank 12 and has a discharge line 27 which terminates externally of hull 11 immediately above water line 28. Suitable removable protective covers 29, 30 are provided for protecting pumps 22, 24 respectively from the elements.

Innermost diesel fuel tank 14 has hollow axial core 31 extending upwardly to the underside of deck 15 thereby defining a hollow internal air space or recess 32 in which is mounted a pair of float means 33, 34 both being suitably mounted to the hull 11 at the underside of deck 15. Float means 33 consists of a float 35 located at or about water line 28 on arm 36 interconnected with electrical means 37 which is wired in the energizing circuit of pump 22 and maintains an open electrical circuit (not shown) whenever float 35 is immersed in water but which closes said electrical circuit whenever float 35 is above said water line. Consequently float means 33 actuates pump 22 to pump ballast water into tank 12 as gasoline and/or diesel fuel is removed from tanks 13, 14 in order to counteract the tendency of the hull 11 to increase its freeboard during the removal of liquid fuels during servicing of marine craft.

Float means 34 similarly consists of float 38 mounted on arm 39 at or about water line 28 and interconnected by electrical means 40 with the energizing circuit of pump 24. Float means 34 causes pump 24 to be energized to pump ballast water out of tank 12 externally of hull 11 whenever float 38 is immersed in water. As shown float 38 is mounted slightly above the level of float 35 so that the automatic ballast water system will be properly operative as will be explained in greater detail below.

Miscellaneous essentials such as cleats 41 and fuel metering apparatus 42 and navigational aids 43, as well as fenders or bumpers 44 are provided on the terminal in accordance with standard marine requirements.

In use, such a terminal 10 is located at some convenient point in a harbor or outer harbor or offshore location and anchored there by any conventional means (not shown). At the start tanks 13 and 14 are filled to capacity with gasoline and diesel fuel respectively and ballast tank 12 is empty. As fuels are withdrawn from tanks 13 and 14 in servicing customers, the weight of hull 11 with its liquid contents decreases, thereby tending to raise the hull above the surface of the water, i.e. increase the freeboard of the hull, but raising float 35 above the surface of the water will cause pump 22 to be energized and ballast water will be pumped into tank 12 thereby counterbalancing the lightening effect of removal of fuel. When the hull is weighed down to the point where float 35 is immersed in the water, then pump 22 will be shut off and no further water pumped into the ballast tank at that time. In this way during removal of fuel the preselected water line 28 is maintained.

After all of the fuel has been removed from tanks 13 and 14 and it is desired to refuel them, upon doing so the total weight of the hull 11 will increase and tend to lower the water line in which case float 38 becomes submerged and actuates pump 24 whereby ballast water is pumped out of the ballast water tank 12 and the preferred weight balance maintained.

In the above fashion a hull structure and pumping arrangement is provided which provides a marine terminal with a relatively stationary water line throughout its period of use. With this novel structure, offshore refueling services may be provided to supply a long standing and ever growing need for users of marine craft.

It is to be understood that certain changes and additions might be made by those skilled in the art without departing from the scope and spirit of the invention.

I claim:

1. A floating marine fuel supply terminal comprising a compartmented hull constituted by a plurality of concentrically disposed liquid tight storage tanks, the radially outermost of said tanks being adapted to hold ballast water and the other tanks being adapted to hold liquid marine fuels, respective metering means interconnected with each of said other tanks to deliver predetermined amounts of fuel therefrom, and pumping means interconnected with said ballast water tank to adjust automatically the amount of ballast water therein to compensate for variations in the amounts of said fuels and maintain the freeboard of said terminal within preselected limits.

2. A floating marine fuel supply terminal comprising a compartmented hull constituted by a plurality of concentrically disposed liquid tight storage tanks, the radially outermost tank having a storage capacity of approximately 9,000 gallons of ballast water, the intermediate tank having a storage capacity of approximately 12,500 gallons of gasoline and the innermost tank having a storage capacity of approximately 1,100 gallons of diesel oil, respective metering means interconnected with said gasoline and said diesel oil tanks to deliver predetermined amounts of fuel therefrom, and pumping means interconnected with said ballast water tank to adjust automatically the amount of ballast water therein to compensate for variations in the amounts of said fuels and maintain the freeboard of said terminal within preselected limits.

3. A floating marine fuel supply terminal comprising a compartmented hull constituted by three concentrically disposed liquid tight storage tanks, the radially outermost tank having a storage capacity of approximately 9,000 gallons of ballast water, the intermediate tank having a storage capacity of approximately 12,500 gallons of gasoline and the innermost tank having a storage capacity of approximately 1,100 gallons of diesel oil, respective metering means interconnected with said gasoline and said diesel oil tanks to deliver predetermined amounts of fuel therefrom, and pumping means interconnected with said ballast water tank to adjust automatically the amount of ballast water therein to compensate for variations in the amounts of said fuels and maintain the freeboard of said terminal within preselected limits.

4. A floating marine fuel supply terminal comprising a compartmented cylindrical hull constituted by three concentrically disposed liquid tight storage tanks, the radially outermost tank having a storage capacity of approximately 9,000 gallons of ballast water, the intermediate tank having a storage capacity of approximately 12,500 gallons of gasoline and the innermost tank having a storage capacity of approximately 1,100 gallons of diesel oil, respective metering means interconnected with said gasoline and said diesel oil tanks to deliver predetermined amounts of fuel therefrom, and pumping means interconnected with said ballast water tank to adjust automatically the amount of ballast water therein to compensate for variations in the amounts of said fuels and maintain the freeboard of said terminal within preselected limits.

5. A floating marine fuel supply terminal comprising a compartmented hull construction having a service deck and respective storage tanks thereunder for ballast water and fuel and a preselected water line for said terminal, a first pump means having an intake line extending to the bottom of said ballast water tank and extending externally of said hull and a discharge line extending into said ballast water tank, a second pump means having an intake line extending to the bottom of said ballast water tank and a discharge line extending externally of said hull, other pump means for delivering metered quantities of said fuel, a first float means mounted on said hull at said water line and interconnected with said first pump means to energize the same to pump ballast water into said ballast water tank when the freeboard of said hull extends below said water line, a second float means on said hull at said water line and interconnected with said second pump means to energize the same to pump ballast water from said ballast water tank when said water line is submerged.

6. A floating marine fuel supply terminal comprising a compartmented hull construction having a service deck and respective storage tanks thereunder for ballast water and fuel and a preselected water line for said terminal, a first pump means having an intake line extending to the bottom of said ballast water tank and extending externally of said hull below said water line, a second pump means having an intake line extending to the bottom of said ballast water tank and a discharge line extending externally of said hull immediately above said water line, other pump means for delivering metered quantities of said fuel, a first float means mounted on said hull at said water line and interconnected with said first pump means to energize the same to pump ballast water into said ballast water tank when the freeboard of said hull extends below said water line, a second float means on said hull at said water line and interconnected with said second pump means to energize the same to pump ballast water from said ballast water tank when said water line is submerged.

7. A floating marine fuel supply terminal comprising a compartmented hull construction having a service deck and respective storage tanks thereunder for ballast water and fuel and a preselected water line for said terminal, a first pump means mounted on said deck having an intake line extending to the bottom of said ballast water tank and extending externally of said hull below said water line, a second pump means mounted on said deck having an intake line extending to the bottom of said ballast water tank and a discharge line extending externally of said hull immediately above said water line, other pump means for delivering metered quantities of said fuel, a first float means mounted on said hull at said water line and interconnected with said first pump means to energize the same to pump ballast water into said ballast water tank when the free board of said hull extends below said water line, a second float means on said hull at said water line and interconnected with said second pump means to energize the same to pump ballast water from said ballast water tank when said water line is submerged.

8. A floating marine fuel supply terminal comprising a compartmented cylindrical hull construction having a service deck thereon and a plurality of concentrically disposed liquid tight storage tanks consisting of an outer ballast water tank, an intermediate gasoline tank, and an inner diesel fuel tank, said diesel fuel tank having a hollow axial core portion defining an interior recess under said deck and above a preselected water line, a first pump means having an intake line extending to the bottom of said ballast water tank and extending externally of said hull below said water line and a discharge line extending into said ballast water tank, a second pump means having an intake line extending to the bottom of said ballast water tank and a discharge line extending externally of said hull immediately above said water line, first and second float means mounted on said hull within said interior recess at said water line, said first float means to energize said first pump means to pump ballast water into said ballast water tank when the freeboard of said hull extends below said water line, said second float means to energize said second pump means to pump ballast water from said ballast water tank when said water line is submerged.

9. A floating marine fuel supply terminal comprising a compartmented cylindrical hull construction having a service deck thereon and three concentrically disposed liquid tight storage tanks consisting of an outer ballast water tank, an intermediate gasoline tank, and an inner diesel fuel tank, said diesel fuel tank having a hollow axial core portion defining an interior recess under said deck and above a preselected water line, a first pump means mounted on said deck having an intake line extending to the bottom of said ballast water tank and extending externally of said hull below said water line and a discharge line extending into said ballast water tank, a second pump means mounted on said deck having an intake line extending to the bottom of said ballast water tank and a discharge line extending externally of said hull immediately above said water line, first and second float means mounted on said hull within said interior recess at said water line, said first float means to energize said first pump means to pump ballast water into said ballast water tank when the freeboard of said hull extends below said water line, said second float means to energize said second pump means to pump ballast water from said ballast water tank when said water line is submerged.

10. A floating marine fuel supply terminal comprising a compartmented cylindrical hull construction having a service deck thereon and three concentrically disposed liquid tight storage tanks consisting of an outer ballast water tank, an intermediate gasoline tank, and an inner diesel fuel tank, the outer tank adapted to hold ballast water in an amount approximately equal to the combined weights of the gasoline and diesel fuel capable of being stored in the other tanks, said diesel fuel tank having a hollow axial core portion defining an interior recess under said deck and above a preselected water line, a first pump means mounted on said deck having an intake line extending to the bottom of said ballast water tank and extending externally of said hull below said water line and a discharge line extending into said ballast water tank, a second pump means mounted on said deck having an intake line extending to the bottom of said ballast water tank and a discharge line extending externally of said hull immediately above said water line, first and second float means mounted on said hull within said interior recess at said water line, said first float means to energize said first pump means to pump ballast water into said ballast water tank when the freeboard of said hull extends below said water line, said second float means to energize said second pump means to pump ballast water from said ballast water tank when said water line is submerged, and a superstructure on said deck for housing personnel and equipment.

References Cited in the file of this patent

UNITED STATES PATENTS

| | | |
|---|---|---|
| 1,773,029 | Cobham | Aug. 12, 1930 |
| 2,724,357 | Brandon | Nov. 22, 1955 |
| 2,748,739 | Monti | June 5, 1956 |
| 2,771,617 | Brackx | Nov. 27, 1956 |